United States Patent [19]

Alieri

[11] Patent Number: 5,123,824
[45] Date of Patent: Jun. 23, 1992

[54] RETENTION DEVICE FOR CROWN CAPS

[75] Inventor: Rodiero Alieri, Imola, Italy

[73] Assignee: SACMI Cooperativa Meccanici Imola S.c.r.l., Imola, Italy

[21] Appl. No.: 674,020

[22] Filed: Mar. 25, 1991

[30] Foreign Application Priority Data

Apr. 13, 1990 [IT] Italy ................. 3449 A/90

[51] Int. Cl.⁵ ............................................. B29C 63/00
[52] U.S. Cl. .................... 425/126.1; 264/268; 425/127; 425/361; 425/809
[58] Field of Search ............... 425/99, 117, 125, 126.1, 425/127, 129.1, 134, 348 R, 809, 361; 264/267, 268

[56] References Cited

U.S. PATENT DOCUMENTS

| | | | |
|---|---|---|---|
| 2,881,475 | 4/1959 | Wilckens | 264/268 |
| 2,952,035 | 9/1960 | Gora | 425/809 |
| 3,135,019 | 6/1964 | Aichele | 425/125 |
| 3,278,985 | 10/1966 | Everett | 425/127 |
| 3,366,723 | 1/1968 | Green | 264/268 |
| 3,827,843 | 8/1974 | Blouch | 425/127 |
| 4,170,445 | 10/1979 | Nishijima | 425/127 |
| 4,274,822 | 6/1981 | Tamai et al. | 425/127 |
| 4,298,320 | 11/1981 | Ohmi et al. | 264/268 |
| 4,518,336 | 5/1985 | Alieri | 425/809 |
| 5,007,150 | 4/1991 | Alieri et al. | 425/125 |
| 5,017,125 | 5/1991 | Finnah | 425/126.1 |

FOREIGN PATENT DOCUMENTS 1043884  9/1966  United Kingdom.

Primary Examiner—Jay H. Woo
Assistant Examiner—Scott Bushey
Attorney, Agent, or Firm—Guido Modiano; Albert Josif

[57] ABSTRACT

Device for retaining crown caps, which can be particularly applied in machines for forming the sealing gaskets inside caps of the type having carousels which have disks which rotate about vertical axes and which further have in the peripheral region thereof semicircular and angularly equidistant seats for the support and transfer of the caps, has a rocker-like lever mounted on the disks, at each semicircular seat, which oscillates within a radial median plane of the seat. The lever has one arm controlled by an actuation cam and can, with the beak-shaped end of the other arm, internally engage the dentellated edge of the cap, so as to retain it in its seat during a preset angle of rotation of the disks.

4 Claims, 2 Drawing Sheets

RETENTION DEVICE FOR CROWN CAPS

BACKGROUND OF THE INVENTION

The present invention relates to a retention device for crown caps, particularly used in a machine for forming the sealing gasket inside said caps.

Machines comprising two carousels which rotate about vertical axes are currently known for the formation of gaskets in crown caps.

A dose of plastic material in the pasty state is inserted in the caps at one of said carousels; said material is then compressed in the other carousel by means of appropriate punches so as to form gaskets which cover the bottom of the caps and ensure tightness when the caps are applied to containers.

So that the dose of plastic material first, and the gasket later, adhere to the inner surface of the caps, said caps are heated beforehand so as to liquify the internal paint which acts as adhesive between the gasket and the cap.

Heating occurs by conveying the caps through a magnetic field emitted by a high-frequency inductor. According to the type of material with which the caps are manufactured, a phenomenon of attraction toward the inductor occurs if the material is ferromagnetic, or a phenomenon of repulsion occurs if the material is diamagnetic, for example aluminum or stainless steel. In order to conveniently increase the efficiency of the inductors, the surface of the caps must pass very close to said inductors without however touching them, in order to avoid short-circuits or abrasions of the paint which covers them externally.

For the transfer of the caps from one carousel to the other, or for the insertion or extraction of the caps from the carousels, and also for the retention of the caps in the carousels, said caps rest toward the inside of appropriate accommodation seats which are defined on the periphery of rotating disks (so-called "stars") which are an integral part of the carousels, and rest, toward the outside, on fixed guides which extend concentrically to said disks.

A fixed cover is arranged above the caps and has the function of better guiding the caps during advancement, especially if said caps are made of a diamagnetic material which would cause their upward repulsion.

Known cap supporting systems have some severe disadvantages, which can be ascribed to the relative movements between the rotating disks and the stationary guides, which cause wear of the outer guides, caused by the friction of the caps as they advance, and of the seats of the stars, since the advancement of the caps causes the rotation of said caps in their seats. These wear phenomena are furthermore worsened by the magnetic attraction and repulsion force.

Another disadvantage which is observed in conventional cap conveyance systems is constituted by sparks due to the electric discharges which occur in the points of contact of the caps with the fixed guides and are caused by currents induced by the magnetic field. Said sparks lead to the wear of the guides and to damage of the caps.

The accommodation of the caps in the respective seats and the guiding thereof furthermore assume a certain play which, in view of the size tolerances of the caps, can cause a misalignment of said caps with respect to the punches and therefore centering errors in the formation of the gaskets.

A further not negligible disadvantage occurs during the passage of the caps from one carousel to the other, since in order to prevent the caps from being allowed to stray during this passage, deflectors are provided which constitute a constructive complication and in any case are troublesome when deformations or variations in the dimensions of the caps add to the negative effects of said plays.

SUMMARY OF THE INVENTION

The aim of the present invention is therefore to obviate these disadvantages by providing a device which is suitable for retaining the caps in the seats defined in the edges of the respective cap conveyance and transfer carousels.

Within the scope of this aim, a further object of the invention is to provide a device which is structurally simple and ensures effectiveness in operation.

This aim and this object are achieved, according to the invention, by the present retention device for crown caps, particularly in a crown-cap manufacturing machine of the type which comprises carousels for the support and transfer of said caps which comprise disks which rotate about vertical axes, said disks being peripherally provided with a series of angularly equidistant and substantially semicircular recesses which constitute accommodation seats for said caps, characterized in that an element is mounted at each seat, said element oscillating within a radial plane and being actuated by stationary cam means between an operative position, in which said element is lowered and retains the cap in said seat, and an inoperative position, in which said element is raised to allow the separation of said cap from said seat.

BRIEF DESCRIPTION OF THE DRAWINGS

The details of the invention will become apparent from the detailed description of a preferred embodiment of the crown cap retention device, illustrated only by way of non-limitative example in the accompanying drawings, wherein.

DESCRIPTION OF THE PREFERRED EMBODIMENTS

With reference to the above figures, the machine for forming sealing gaskets in crown caps comprises as dosage carousel 1 which rotates, by means of appropriate rotation means, such as for example motor means, advantageously actuated with continuous motion, about a vertical axis A.

Figure 1:
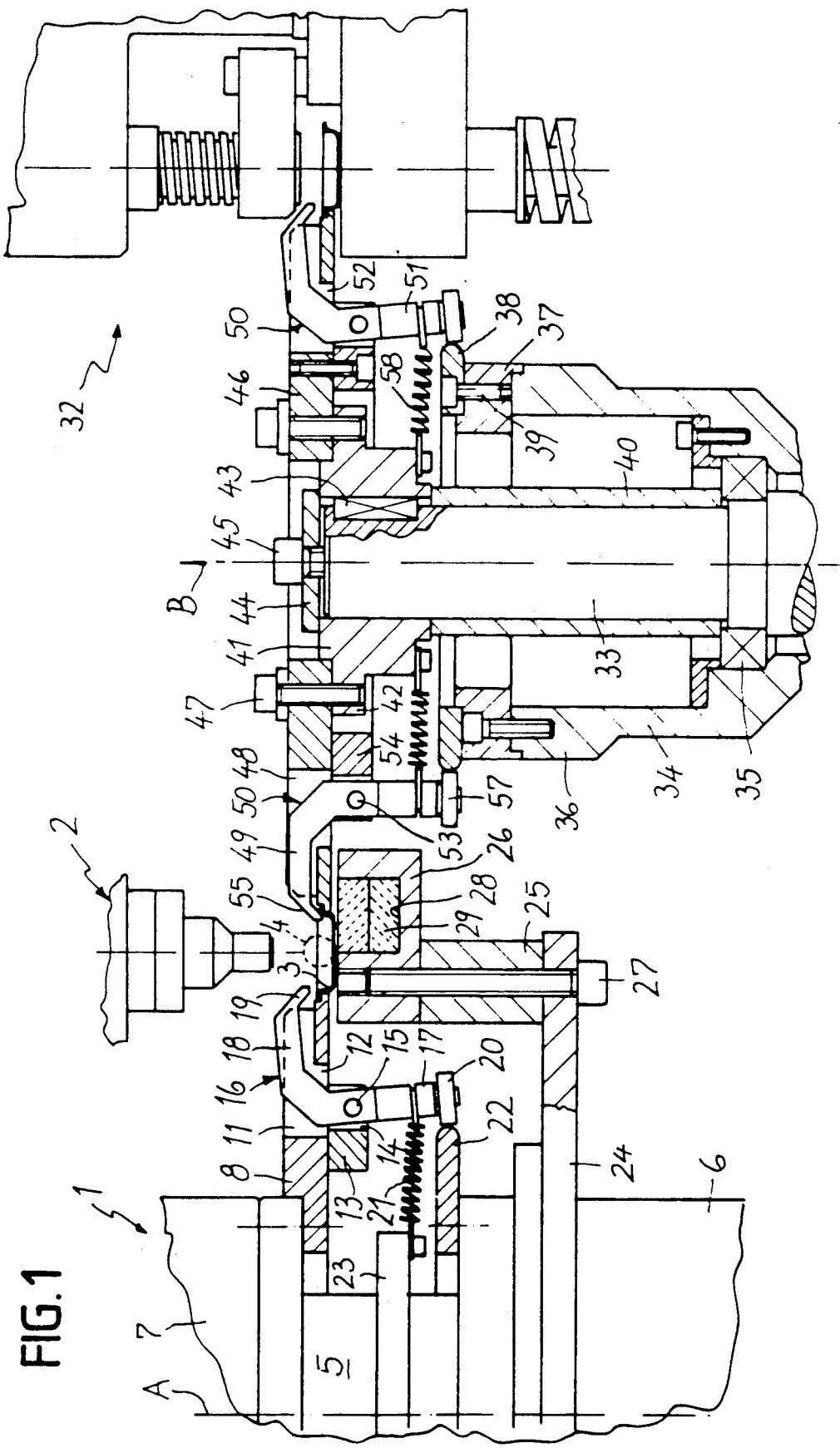
FIG. 1 is a sectional elevation of the retention device according to the present invention arranged in a machine for forming gaskets in crown caps.

The carousel 1 bears a plurality of dosage units 2 distributed angularly and concentrically about the axis A. Every dosage unit 2 can draw a dose of plastic material in the pasty state, for example supplied by an extruder, and place it inside a crown cap which is supported and rotated by the carousel 1. In FIG. 1, the reference numeral 3 indicates a cap and the numeral 4 indicates a dose of plastic material placed in the cap.

Each dosage unit supplies the dose 4 to a related cap in a known manner and is actuated vertically by an axial stationary cam (not illustrated) which extends concentrically about the axis A.

The carousel 1 comprises a shaft 5 which protrudes upward from a stationary sleeve 6 in which it is rotatably supported. The sleeve 6 rises from the base of the machine, which is not illustrated.

A cylindrical head 7 is rigidly rotationally associated with the upper part of the shaft 5, and a horizontal disk 8 is centered and fixed therein.

Said disk 8 is star-shaped due to the presence, along its edge, of a series of semicircular recesses 9 which are angularly equidistant and are open outward.

The recesses 9 are vertically aligned with respective dosage units 2 and have an edge machined complementarily to the outer contour of the caps. In particular, a seat 10 is defined in the edge and acts as support for the dentellated protruding lip which surrounds the caps.

Slots 11 are defined in the disk 8 and extend radially in the median plane of each recess 9. The slots 11 are open at the upper face of the disk 8 and are connected to through openings 12 defined in the lower face of the disk 8.

A block 13 is fixed below the disk 8 at each slot 11 and has a notch 14 at the openings 12.

Respective L-shaped levers 16 are articulated in a rocker-like manner in the notches 14 of the various blocks 13 by means of pivots 15; said levers have an arm 17 which extends downward and a radial arm 18 which continues upward, through the opening 12, is perpendicular to the arm 17 and engages the slot 11. The end of the arm 18 protrudes radially from the slot 11 and has a beak-shaped end 19 which is bent obliquely downward and extends so as to reach the seat 10.

A roller 20 is mounted at the lower end of each arm 17 and, by means of a traction spring 21, is kept in tangential engagement on the profile of a radial cam 22.

One end of the springs 21 is coupled to the arms 17 and the opposite end is connected to a collar 23 which is rigidly associated with the shaft 5.

The cam 22 is centered and fixed at the top of the sleeve 6 and is thus stationary.

A horizontal bracket 24 is fixed to the sleeve 6 below the cam 22, and an element 26 is mounted thereon by means of spacers 25 and is locked by means of screws 27; the element 26 defines an upper horizontal surface which is arranged directly below the disk 8.

A channel 28, open upward and external with respect to the disk 8, is defined in the element 26.

The channel 28 constitutes an accommodation for a permanent magnet 29 the function whereof is to exert an attractive force on the caps which pass proximate thereto, so as to cause their extraction from their respective semicircular recesses and their insertion in respective recesses 30 of a transfer star 31 which transfers the caps 3 into a punching carousel 32, where the dose 4 of pasty plastic material is pressed so as to form a layer which covers the bottom of the caps.

The star 31 is constituted by a vertical shaft 33 which can rotate, by means of appropriate rotation means, about the axis B and is rotatably supported, by means of bearings 35, in a sleeve 34, which is also fixed to the base of the machine and therefore fixed relative to sleeve 6; a ring 37 is fixed at the enlarged top 36 of the sleeve 34, and a radial cam 38 is centered on said ring 37, is fixed by screws 39 and is co-planar to the cam 22.

The bearing 35 is locked against a shoulder of the shaft 33 by a tubular spacer 40 on which a bush 41 rests; said bush 41 is provided with an external annular flange 42.

The bush 41 is rigidly associated with the shaft 33 by a key 43 and is locked axially by a disk 44 which is pressed against it by a screw 45 which is screwed to the head of the shaft 33.

A disk 46 is arranged on the flange 42 and is secured by screws 47. The disk 46 is similar to the disk 8 and therefore has radial slots 48 defined in the median plane of the recesses 30 and engaged by the radial arms 49 of rockers 50 which, together with the other arms 51, extend through openings 52 below the disk 46.

The rockers 50 are articulated by means of dowels 53 in blocks 54 which are fixed below the disk 46.

The ends of the radial arms 49 define beaks 55 which can retain the caps so that their dentellated protruding lip engages the seats 56 defined along the upper edge of the recesses 30.

The rockers 50 have rollers 57 which are kept in contact with the rim of the cam 38 by traction springs 58 which are connected between the arm 51 and the bush 41.

The operation of the device is as follows.

Figure 2:
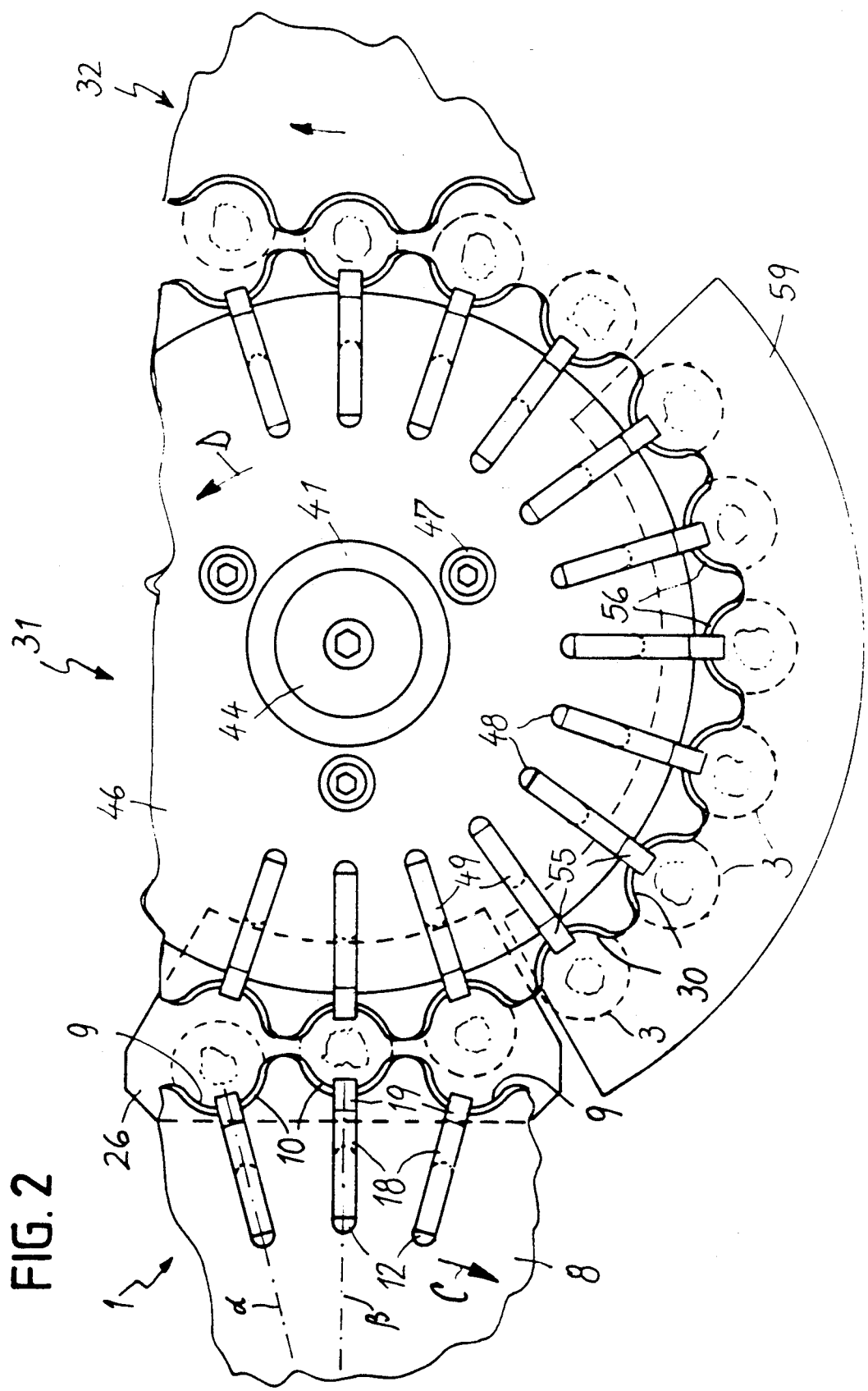
FIG. 2 is a plan view of the retention device shown in FIG. 1.

Presetting the rotation of the carousel 1 in the clockwise direction C of FIG. 2, the star 31 rotates in the counterclockwise direction D. The rotation rate of the carousel 1 and of the star 31 are chosen so that the tangential speeds of the disks 8 and 46 are identical.

The carousel 1 and the star 31 are furthermore set in step so that the recesses 9 and 30 are arranged opposite at the point of tangency.

As soon as the caps 3 are inserted in the recesses 9 by a suitable feeding device, the actuation imparted by the cam 22 causes the oscillation of the rocker 16 in the direction in which the beak 19, by lowering, in cooperation with the disk 8, clamps the dentellated edge of the cap 3 in the seat 10.

Due to the semicircular configuration of the edges of the recesses 9, the caps retained by the beaks 19 assume a perfectly horizontal arrangement. When the caps reach the angular position $\alpha$ (alpha) ahead of the point of tangency $\beta$ (beta) between the carousel 1 and the star 31, the rockers 16 are actuated in the direction of opening the beaks 19, so that the caps, due to a centrifugal effect and to the attraction exerted by the magnets 28, leave the recesses 9 and pass into the opposite recesses 30, the beaks 55 whereof are in a raised position. When the caps are in the tangency position, the rockers 50 of the star 31 are actuated by the cam 38 and roller 57 engagement and, by means of the beaks 55 which are thereby lowered, retain the caps at a point which is diametrically opposite to the retention point of the beaks 19.

The caps then reach the punching carousel 32, to which they are delivered after the lifting of the beaks 55 again actuated by the cam 38 and roller 57 engagement. During this transit, the caps pass above an appropriate inductor to facilitate the adhesion of the gasket on the internal surface.

The substantial advantage of the device according to the invention is to be seen in the fact that the caps, contrary to what occurs in conventional cap manufacturing machines, do not slide in their supporting seats, so that the disadvantages mentioned above do not occur.

The effects due to the size tolerances of the caps or to deformations thereof, which in conventional machines makes the passage of the caps from one carousel to the other critical, are furthermore minimized.

The device according to the invention is not limited to application in a machine for manufacturing crown caps, but can be applied generally also in machines in which it is necessary to achieve the transfer of objects avoiding traction along a plane.

I claim:

1. Retention apparatus for crown caps, in a machine which comprises carousels for supporting and transferring said caps, said carousels comprising disks which rotate about vertical axes, said disks being peripherally provided with a series of substantially semicircular and angularly equidistant recesses which constitute accommodation seats for said caps, wherein an element is mounted at each seat, said element oscillating within a substantially radial plane and being actuated by stationary cam means between an operative position, wherein said element is lowered and retains said cap in said seat, and an inoperative position, wherein the element is raised to allow a separation of the cap, and wherein said element comprises a pivotable L-shaped lever having one arm extending below the disk and hearing a roller which engages an actuation can, said lever having another arm extending through a through slot of the disk in a radial direction in a median plane of a respective one of said recesses, said other arm having a beak-shaped end suitable for acting on a dentellated edge of the crown cap for retention thereof in the seat of the respective one of said recesses.

2. Apparatus according to claim 1, further comprising spring means which act on said lever to keep said roller in tangential engagement on a periphery of a stationary cam.

3. Apparatus according to claim 1, wherein magnets are provided below the disks, at a region of tangency between said carousels, and are suitable for attracting the caps into the recesses intended to receive said caps.

4. Apparatus according to claim 1, wherein the outer arm of said lever is recessed in a radial slot of the disks.

* * * * *